United States Patent
Hall

(10) Patent No.: US 6,282,030 B1
(45) Date of Patent: Aug. 28, 2001

(54) EYEPIECE ASSEMBLY USING PLASTIC ASPHERIC ELEMENT

(75) Inventor: John M. Hall, Alexandria, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/556,330

(22) Filed: Apr. 24, 2000

(51) Int. Cl.[7] ............................ G02B 25/00; G02B 13/22; G02B 13/18
(52) U.S. Cl. ............................ 359/644; 359/663; 359/715
(58) Field of Search ..................... 359/643, 644, 359/663, 708, 713–715

(56) References Cited

U.S. PATENT DOCUMENTS

| 5,638,213 | * | 6/1997 | Ueno | ................................... | 359/643 |
| 5,726,808 | * | 3/1998 | Suzuki | ................................ | 359/645 |
| 6,104,542 | * | 8/2000 | Omura | ................................. | 359/643 |

* cited by examiner

*Primary Examiner*—Jordan M. Schwartz
(74) *Attorney, Agent, or Firm*—Milton W. Lee; John E. Holford; Alain L. Bashore

(57) ABSTRACT

An eyepiece lens assembly including a collecting lens, glass spherical cemented doublet, a plastic singlet, and a glass spherical singlet. The assembly provides over 30 degrees extended field of view, a greater than 30 mm eye relief, under 5% distortion, a substantially telecentric focal plane, and weighing under 6 ounces.

5 Claims, 4 Drawing Sheets

EYEPIECE ASSEMBLY USING PLASTIC ASPHERIC ELEMENT

BACKGROUND OF THE INVENTION

1. Field of the Invention

The present invention generally relates to eyepiece lens assemblies and more specifically, to an eyepiece lens assembly using a plastic aspheric element.

2. Description of Prior Art

It is often required that the eyepiece of a rifle scope provide an extended eye relief distance beyond 30 mm in order to prevent the event of rifle firing "kickback", forcing the scope backwards, and injuring the user's eye. In addition, for rifle scopes with modern integrated displays and reticules, it is also desirable to provide an oversized exit pupil (over 10 degrees) to accommodate eye wander and make it easier to view the display. In many cases, the modern eyepiece display assemblies may include display sources such as Cathode Ray Tubes (CRT's) or Flat Panels (such as Liquid Crystal Displays), in which case it may be also required that a lightweight eyepiece (under 6 ounces) is used. The eyepiece must also provide its own distortion correction independent of any objective optics (under 5% distortion) to be useable with other devices. For certain types of Flat Panel displays, and for large amounts of dioptric focus adjustment, it is also desirable that the eyepiece provide a near-telecentric focal plane on the display device (at least within +or −2/10 diopter).

Eyepiece design is a thoroughly explored subject to the point where nearly all the best solutions based upon spherical glass optics have already been utilized. Many of these design types have been named after their primary proponents, such as "Kellner", "Ramsden", "Berthele", and "Erfle." For the case of rifle scopes, it is common for these eyepieces which use spherical, all-glass lenses to provide the extended eye-relief at the expense of exit pupil diameter. The Berthele eyepiece is known to consist of a desired eye exit pupil location, followed by two singlet lenses (usually of the same glass type), and then followed by a cemented glass doublet. Nearly all the common forms of eyepiece design, that cover extended field of 300 or more, will have about 5%–10% distortion which must be corrected for in the rest of the optical system. The general performance for the Berthele eyepiece includes 10× eyepiece magnifying power, field coverage up to 400, distortion about 8%, eye relief at about 25 mm, and an eye pupil diameter of about 5 mm.

While the prior art has reported using optical eyepiece assemblies, none have established a basis for a specific optical assembly that is dedicated to the task of resolving the particular problem at hand. What is needed in this instance is a lightweight optical assembly utilizing plastic lens element to achieve an extended field of view that covers over 30 degrees, provides eye relief greater than 30 mm, minimal distortion and astigmatism.

SUMMARY OF THE INVENTION

It is therefore one object of the invention to provide a lightweight optical assembly utilizing plastic lens element to achieve an extended field of view that covers over 30 degrees, provides eye relief greater than 30 mm, minimal distortion and astigmatism.

According to the invention, there is disclosed an eyepiece lens assembly for providing over 30 degrees extended field of view and a greater than 30 mm eye relief. A collecting lens collects incoming light which is then received by a glass spherical cemented doublet. A plastic singlet with a first and second surface on said optical axis after said glass spherical cemented doublet, said second surface includes a aspheric surface that allows for substantially simultaneous control of field flatness, astigmatism, and distortion. A glass spherical singlet provides final focus and color correction onto a focal plane. The eyepiece lens assembly provides over 30 degrees extended field of view, a greater than 30 mm eye relief, under 5% distortion, a substantially telecentric focal plane, and extremely lightweight.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
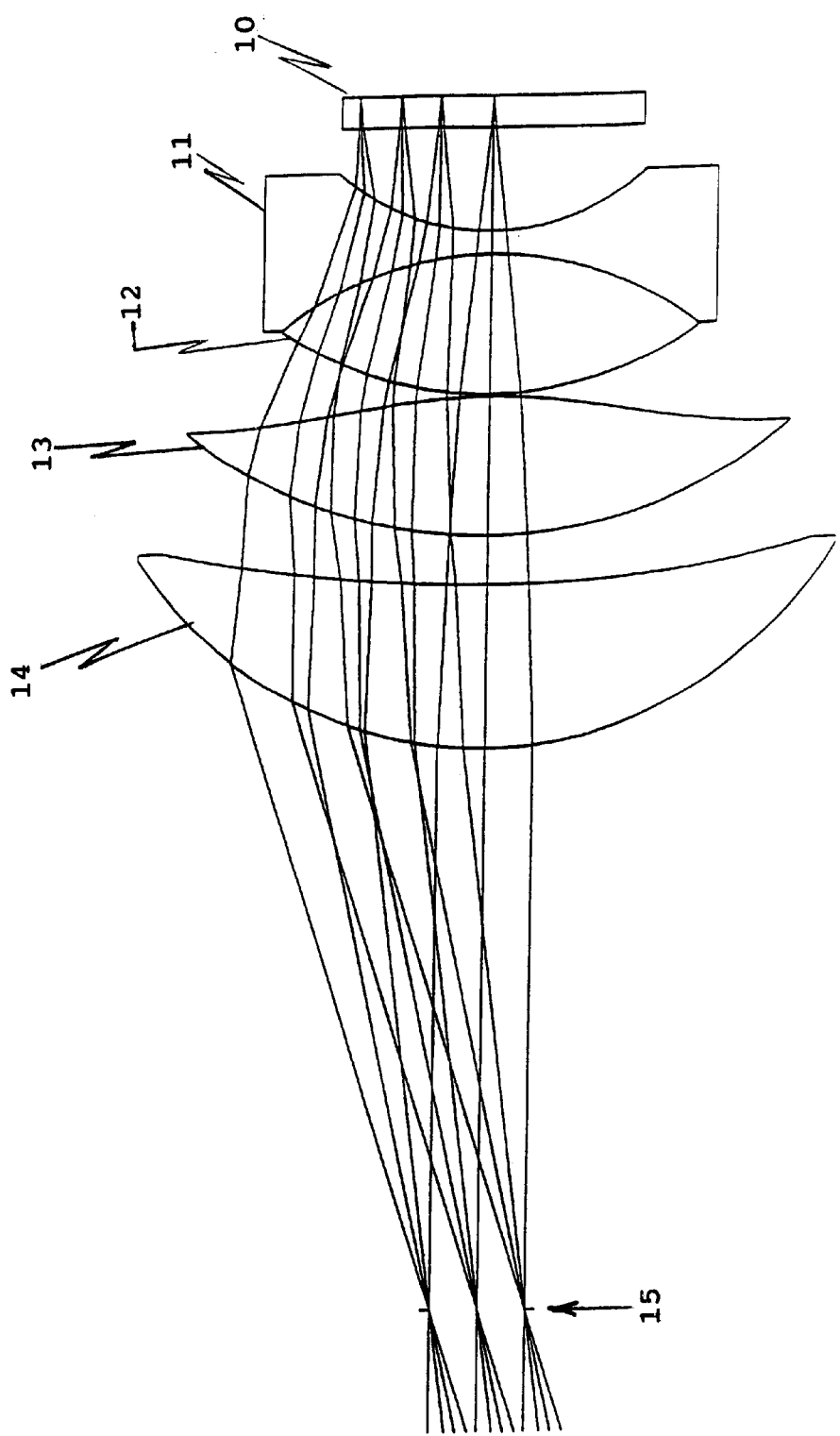
FIG. 1 is an optics layout of superimposed raytraces for the optical assembly of the present invention.

Referring now to the drawings, and more particularly to FIG. 1, there is shown an optics layout of superimposed raytraces for the optical assembly of the present invention. Light enters the optical assembly through lens element 10 which functions to collect incoming light. Light from lens element 10 proceeds into lens elements 11 and 12 that together are a glass spherical cemented doublet. Lens elements 11 and 12 provide flatness and color correction. Lens element 13 then receives light from the glass spherical cemented doublet. Lens element 13 is a plastic singlet with one aspheric surface that allows for simultaneous control of field flatness, astigmatism, and distortion. Light is then received by lens element 14, a glass spherical singlet, which provides final collimation for convergence at focal plane 15.

Table 1 details a lens prescription for the eyepiece lens assembly. A positive radius shown in the table indicates the center of curvature is to the right and a negative radius indicates the center of curvature is to the left. Dimensions are given in inches and thickness is axial distance to the next surface. Image diameter shown is a paraxlal value; not a ray traced value.

TABLE 1

| EL # | Radius of Curvature | | Thickness | Aperture Diameter | | Glass Code |
|---|---|---|---|---|---|---|
| | Front | Back | | Front | Back | |
| OBJECT | INF DECENTER(1)*1 | | INFINITY | | | |
| | | | STOP 1.1900 | | 0.2000 | |
| 10 | 0.8500 CX | 2.8271 CC | 0.3390 0.1032 | 1.3542 | 1.3126 | PK2 Schott |
| 11 | 0.9795 CX | A(1) | 0.2962 0.0050 | 1.1893 | 1.1644 | 'acrylic' |
| 12 | 0.7626 CX | −0.6993 CX | 0.2928 | 0.8686 | 0.8502 | PSK3 Schott |
| 13 | −0.6993 CC | 0.4803 CC | 0.0500 0.2159 | 0.8502 | 0.6057 | SF1 Schott |
| 14 | INF | INF | 0.0700 | 0.5722 | 0.5601 | BALK1 Schott |
| | IMAGE DISTANCE = | | 0.0000 | | | |
| IMAGE | INF | | | 0.5601 | | |

Other glass suppliers can be used if their materials are functionally equivalent to the extent needed by the design. The reference wavelength is 546.0 nm for the spectral region of 534.0 to 558.0 nm. The value "A(1) denote an aspheric surface described in terms of the constants and derived equation shown in Table 2.

TABLE 2

$$Z = \frac{(CURV)Y^2}{1 + (1 - (1+K)(CURV)^2 Y^2)^{1/2}} + (A)Y^4 + (B)Y^6 + (C)Y^8 + (D)Y^{10}$$

| ASPHERIC | CURV | K | A |
|---|---|---|---|
| A(1) | −0.89675920 | 0.000000 | 1.21071E+00 |

| ASPHERIC | B | C | D |
|---|---|---|---|
| A(1) | −1.65054E+00 | 2.30233E+00 | −1.42697E+00 |

Performance measures are normally done in the prior art using the standard 5 mm eye pupil diameter. Table 3 shows the decenter system for the optical assembly of the present invention where a 10 mm useable pupil performance is evaluated by decentrering the 5 mm eye pupil by + or −2.5 mm.

TABLE 3

| DECENTER | X | Y | Z | |
|---|---|---|---|---|
| D(1) | 0.0000 | 0.0000*1 | 0.0000 | |
| DECENTER | ALPHA | BETA | GAMMA | |
| D(1) | 0.0000 | 0.0000 | 0.0000 | (RETU) |

A decenter defines a new coordinate system (displaced and/or rotated) in which subsequent surfaces are defined. Surfaces following a decenter are aligned on the local mechanical axis (z-axls) of the new coordinate system. The new mechanical axis remains in use until changed by another decenter. The order in which displacements and tilts are applied on a given surface is specified using different decenter types and these generate different new coordinate systems; those used here are explained below. Alpha, beta, and gamma are in degrees.

Table 4 lists the first order parameters for the eyepiece lens assembly shown in FIG. 1.

TABLE 4

| FOCAL LENGTH | |
|---|---|
| EFL = | 0.9116 |
| BFL = | 0.0033 |
| FFL = | 0.0234 |
| FOCAL IMAGE | |
| F/NO = | 4.5580 |
| IMAGE DIST = | 0.0000 |
| OAL = | 2.5620 |
| PARAXIAL IMAGE | |
| HT = | 0.2850 |
| SEMI-FIELD ANGLE = | 17.3600 |
| ENTER PUPIL | |
| DIAMETER = | 0.2000 |
| DISTANCE = | 0.0000 |
| EXIT PUPIL | |
| DIAMETER = | 7.7860 |
| DISTANCE = | 35.4919 |
| APER STOP | |
| DIAMETER = | 0.2000 |

The front focal length (FFL) is measured from the first surface and the back focal length (BFL) is measured from the last surface. The wavelengths and first order parameters shown in Table 4 disclose a fast F#, compact size, and good optical performance as shown by the MTF in FIG. 2 and distortion curves in FIGS. 3 and 4.

Table 5 discloses a center of mass analysis for the eyepiece lens assembly. Volume and weight are measured in ounces and pounds with the center of mass defined on a standard X-Y-Z.

TABLE 5

| ELEMENT # | SPEC | | | CENTER OF MASS | | |
|---|---|---|---|---|---|---|
| | VOLUME | GRAV | WEIGHT | X | Y | Z |
| 1 | .336 | 2.510 | 0.030 | 0.000 | 0.000 | 0.253 |
| 2 | .173 | 1.190 | 0.007 | 0.000 | 0.000 | 0.165 |
| 3 | .089 | 2.910 | 0.009 | 0.000 | 0.000 | 0.144 |

TABLE 5-continued

| ELEMENT # | SPEC | | | CENTER OF MASS | | |
|---|---|---|---|---|---|---|
| | VOLUME | GRAV | WEIGHT | X | Y | Z |
| 4 | .164 | 4.460 | 0.026 | 0.000 | 0.000 | 0.026 |
| 5 | .022 | 2.700 | 0.002 | 0.000 | 0.000 | 0.035 |

TOTAL WEIGHT = 0.07578 POUNDS
SYSTEM CENTER OF MASS = (0.000, 0.000, 1.868)
MEASURED FROM THE FIRST SURFACE SYSTEM

The overall design as described in Table 5 is extremely lightweight, with a total lens weight of 0.076 pounds.

Figure 2:
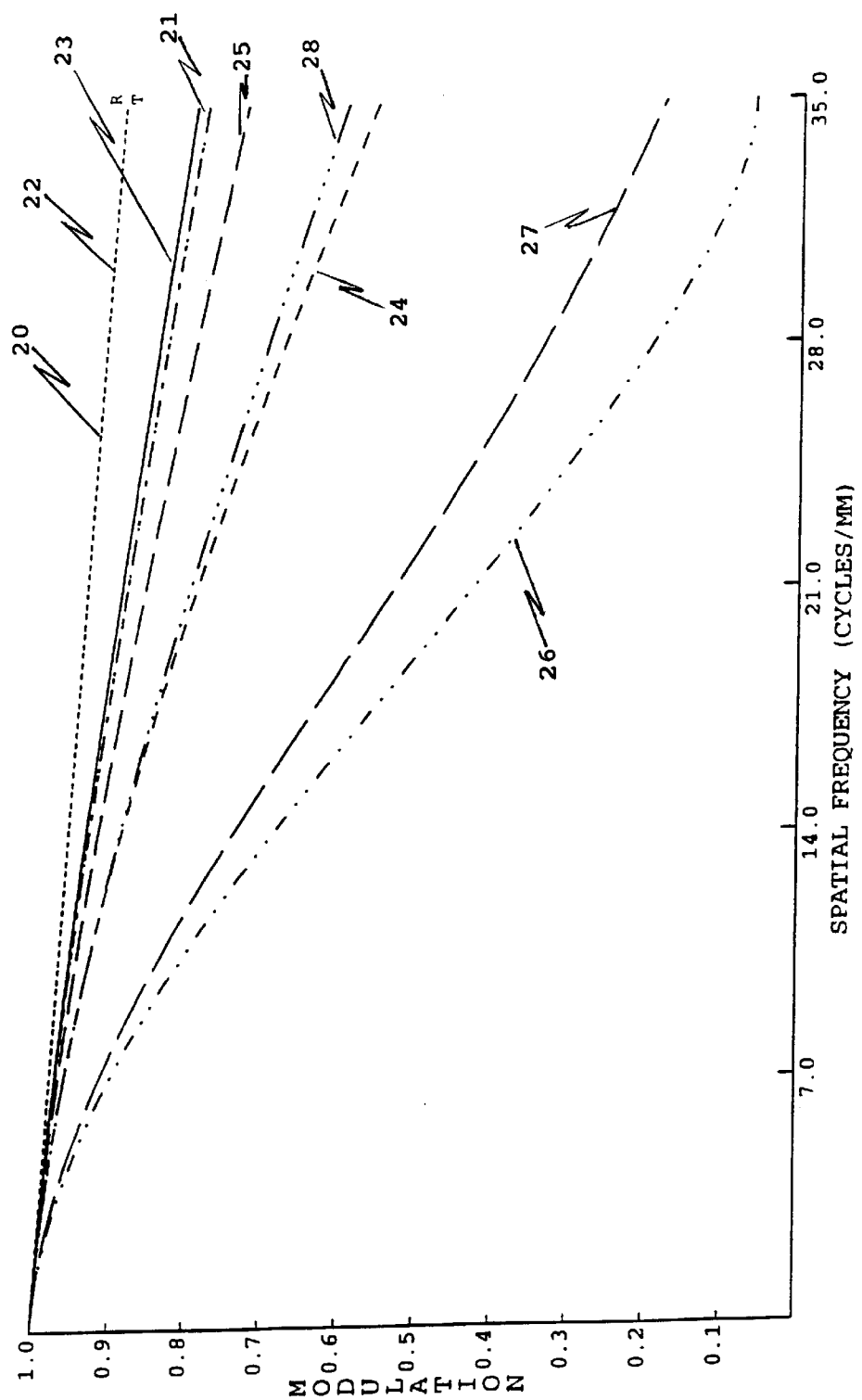
FIG. 2 is a graph of the polychromatic modulation transfer function for the optical assembly of FIG. 1.

FIG. 2 is a graph of the polychromatic modulation transfer function for the optical assembly of FIG. 1. Lines 20 and 22 represents the theoretical best diffraction limited MFT. Lines 21 is designated on-axis, zero degree field of view MTF for the radial and tangential components. Lines 23 and 24 are the radially and tangentially oriented MTF's for +/−6.94 degrees. Lines 25 and 26 are the radially and tangentially oriented MTF's for +/−12.15 degrees. Lines 27 and 28 are the radially and tangentially oriented MTF's for a full field of +/−17.36 degrees. The MTF performance shown in FIG. 2 indicates near diffraction-limited resolution beyond a spatial frequency of 35 line-pairs per millimeter in the focal plane. Various wavelength weight factors is shown in Table 6 as the basis for the MTF performance shown in FIG. 2.

TABLE 6

| Wavelength | Weight |
|---|---|
| 558.0 | 7 |
| 554.0 | 22 |
| 550.0 | 63 |
| 546.0 | 99 |
| 542.0 | 92 |
| 538.0 | 49 |
| 534.0 | 9 |

[Please delete any of the described lines from the above description if not needed to describe the invention. Also check if all line numbers correspond to FIG. 2]

Figure 3:
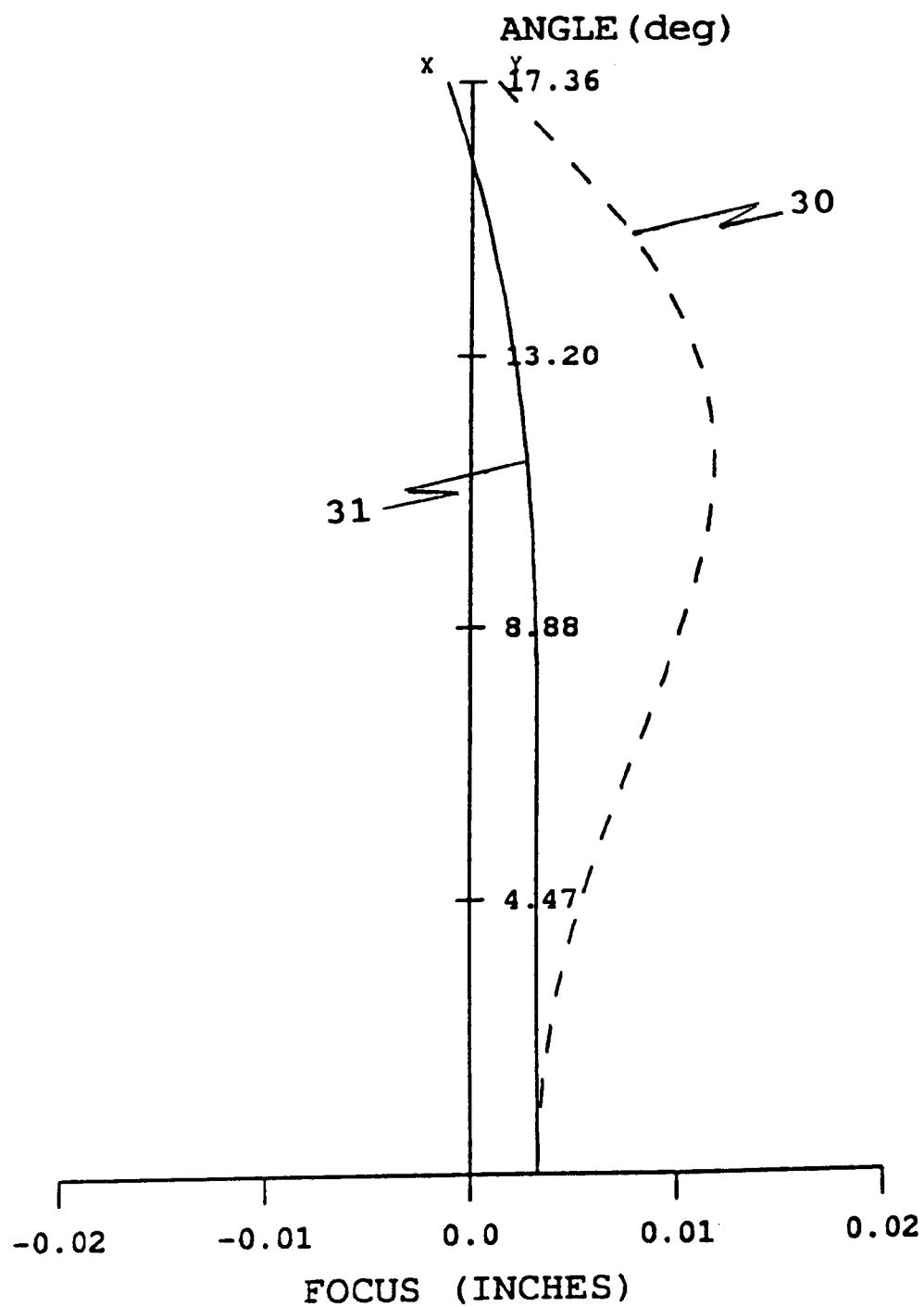
FIG. 3 is an astigmatic field plot for the optical assembly of FIG. 1.
Figure 4:
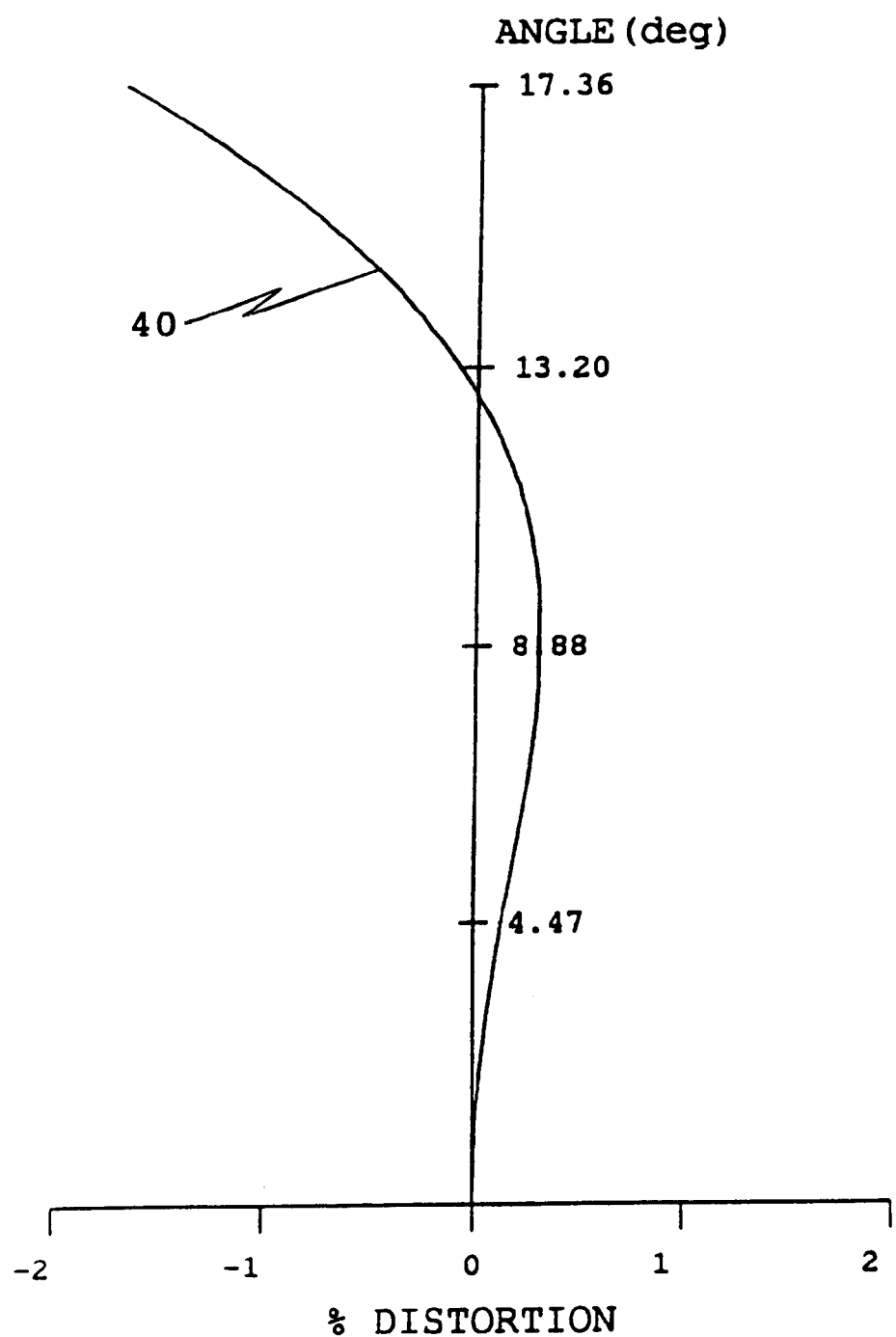
FIG. 4 is a distortion field curvature plot for the optical assembly of FIG. 1.

FIGS. 3 and 4 show an astigmatic field plot and a distortion field curvature plot both for the optical assembly of FIG. 1. In FIG. 3, line 30 is the tangential asigmatic field curve while line 31 is the sagittal component of the astigmatic field curve. In FIG. 4, line 40 represents the percent distortion regarding performance of the invention. Astigmatism is the dominant aberration due to the requirement for a flat field image plane, but is controlled within +or −⅛ diopter for satisfactory imaging results.

The plastic aspheric lens can be manufactured in a variety of ways. For small quantity production, single-point diamond turning is proven to be a satisfactory method, but for large quantities, the best method of fabrication is usually a cast molding process, wherein the master mold may itself be diamond turned or otherwise machined.

The performance of the new eyepiece includes about 10× eyepiece magnification, coverage over 35°, less than 2% distortion, over 30 mm eye relief, and excellent image quality (characterized by MTF) over a full 10 mm exit pupil. Performance improvement over prior art designs include two times larger usable eye pupil diameter, longer eye relief greater than 30 mm, distortion under 2%, and light weight lens components.

While this invention has been described in terms of preferred embodiment consisting of an optical assembly, those skilled in the art will recognize that the invention can be practiced with modification within the spirit and scope of the appended claims.

Having thus described my invention, what I claim as new and desire to secure by Letters Patent is as follows:

1. An eyepiece lens assembly for providing over 30 degrees extended field of view and a greater than 30 mm eye relief, the eyepiece lens assembly comprising:

a collecting lens positioned on the optical axis for collecting incoming light;

a glass spherical cemented doublet on the optical axis after said collecting lens for providing flatness and color correction;

a plastic singlet with a first and second surface on said optical axis after said glass spherical cemented doublet, said second surface is aspheric and said second surface allows for substantially simultaneous control of field flatness, astigmatism, and distortion;

a glass spherical singlet on said optical axis after said plastic singlet providing final focus and final collimation onto a focal plane, whereby the eyepiece lens assembly provides over 30 degrees extended field of view, a greater than 30 mm eye relief, under 5% distortion, a substantially telecentric focal plane, and weighing under 6 ounces.

2. The eyepiece lens assembly of claim 1 wherein said glass spherical singlet further includes a convex and concave surface.

3. The eyepiece lens assembly of claim 1 wherein said plastic singlet further includes two convex surfaces.

4. The eyepiece lens assembly of claim 1 wherein said glass spherical cemented doublet includes two concave surfaces.

5. The eyepiece lens assembly of claim 1 further wherein there is located a display source at said substantially telecentric focal plane.

* * * * *